United States Patent [19]

Jarmann

[11] 4,138,780

[45] Feb. 13, 1979

[54] TOOL FOR REMOVING AND INSERTING BOLTS IN CONNECTING RODS

[76] Inventor: Adolf Jarmann, 23426 Summit Rd., Los Gatos, Calif. 95030

[21] Appl. No.: 860,864

[22] Filed: Dec. 15, 1977

[51] Int. Cl.² ............................................. B23P 19/02
[52] U.S. Cl. ....................................... 29/525; 29/252
[58] Field of Search ............ 29/428, 244, 525, 526 R, 29/252; 227/141, 154

[56] References Cited

U.S. PATENT DOCUMENTS

| 3,713,198 | 1/1973 | Tobak et al. ................... 29/252 X |
| 3,995,361 | 12/1976 | Scheller .......................... 29/252 X |

*Primary Examiner*—Milton S. Mehr
*Attorney, Agent, or Firm*—Gerald L. Moore

[57] ABSTRACT

A tool for use with a hydraulic press for holding a connecting rod to enable the removal and reinsertion of the connecting rod bolts by actuation of the press.

3 Claims, 6 Drawing Figures

TOOL FOR REMOVING AND INSERTING BOLTS IN CONNECTING RODS

BACKGROUND OF THE INVENTION

Connecting rods are used to connect the piston and the crankshaft of an internal combustion piston engine. After usage such rods frequently are reworked for reinstallation into an engine. Such rods comprise a small end having an opening therethrough for attachment to the wrist pin of the piston. The other, or large end of the connecting rod is fitted around the crankshaft. For attachment to the crankshaft the large end is formed in a semicircular shape and there is bolted thereto a cap completing the opening which receives the crankshaft. Connecting rod bolts are passed through holes in the cap and through the end of the connecting rod. By tightening nuts threaded onto these bolts the cap holds the connecting rod on the crankshaft.

During usage the edges of the rod and cap forming the openings through which the wrist pin and crankshaft pass will gradually wear due to the relative movement therebetween. During rework of the connecting rod these openings must be rebored or honed. For boring the crankshaft opening, the cap is removed and the bolts must be forced from the connecting rod holes. Thereafter the abutting surfaces of the connecting rod and cap are machined, the bolts are reinserted into the connecting rod and the cap is replaced. At this time the crankshaft opening is honed or rebored to the proper size and circular configuration.

In the past the connecting rod bolts are inserted by use of a hammer or at times the connecting rod is heated so that the bolts can be placed into the thermally expanded opening. In most shops which rework connecting rods, a brass hammer is used to pound these bolts from the connecting rod and subsequently to reinsert the bolts into the connecting rod holes. Naturally such pounding on the connecting rod can result in damage or breakage. It is especially true that the newly ground surfaces on the connecting rod can be marred while reinserting bolts into the holes by pounding them with a brass hammer.

It is the purpose of this invention to provide an improved tool which can be used with a hydraulic press for easy and safe removal and reinsertion of connecting rod bolts.

SUMMARY OF THE INVENTION

For removal of the bolts from a connecting rod there is provided a holder which can be attached to the ram of a hydraulic press. The connecting rod is mounted on the holder in a position with the bolts extending downward towards the press platen. By actuation of the ram, the connecting rod is moved downward to bring the bolts into engagement with the platen and force them from the connecting rod holes.

For reinsertion of the connecting rod bolts, the bolts are placed into the rod bolt holes as far as possible without pressure. The rod small end is inserted into a pedestal on the platen with the rod large end extending upward towards the ram. The pedestal includes upward facing surfaces contacting the bolt heads. Thereafter a bridge member is placed on the upper facing surfaces of the connecting rod and the ram is actuated downward into engagement therewith to force the connecting rod downward thereby causing the bolts resting in contact with the pedestal to be forced into the connecting rod holes.

DESCRIPTION OF THE INVENTION

Figure 1:
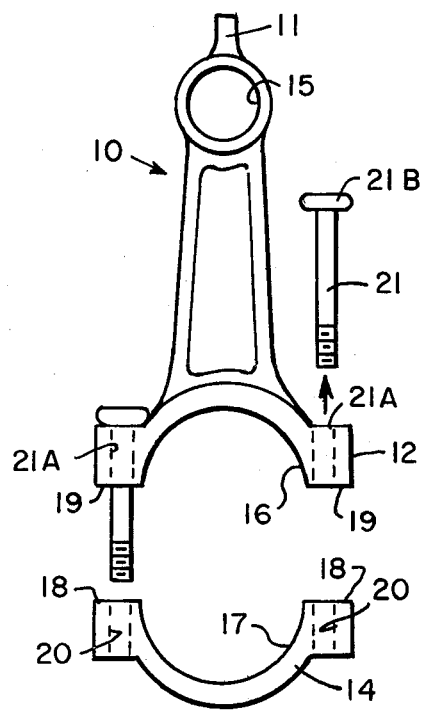
FIG. 1 shows a typical connecting rod and cap with one connecting rod bolt in place and one bolt removed from the rod bolt hole.

Shown in FIG. 1 is a connecting rod 10 comprising a small end 11 and a large end 12 to which a cap 14 is attached. The small or wrist pin end 12 includes an opening 15 for receiving the wrist pin of a piston (not shown). The large or crankshaft end 12 includes a semicircular bearing surface 16 which fits partially around a crankshaft (not shown). For holding the connecting rod on a crankshaft the cap 14 which includes a semicircular surface 17 and flat surfaces 18 fits against a pair of complementary flat surfaces 19 on the large end of the connecting rod. The connecting rod includes a pair of bolt holes 21A which align with the bolt holes 20 in the cap and through which connecting rod bolts 21 are inserted for attaching the cap and clamping the crankshaft (not shown) to the connecting rod.

After the grinding of the surfaces 18 and 19 on the cap and connecting rod respectively as described previously, the cap and connecting rod are joined and the surfaces 16 and 17 are honed or bored to size for receiving the crankshaft. In addition the opening 15 for receiving the piston wrist pin is honed or bored to the proper size. As a result there is provided a reworked connecting rod suitable for further use in the combustion engine.

As just described the bolts 21 must be removed from the bolt holes 21A prior to the machining of the surfaces 19. These bolts are pressed into these holes and can usually only be removed by the application of an axial force thereon. Past practice has involved the pounding of the bolts out of the rods with a brass hammer. Naturally the removing operation may not be as critical as the reinsertion of these bolts because of the possibility of marring or otherwise damaging the surfaces 19 which have already been machined.

Figure 2:
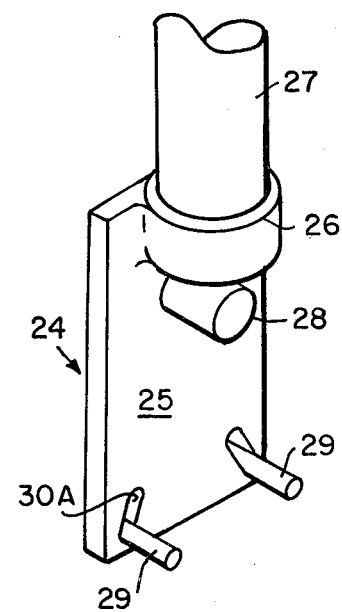
FIG. 2 shows the connecting rod holder in position on the ram of a press for removal of connecting rod bolts.

In accordance with the present invention there is provided a combination tool for use in conjunction with a hydraulic press for the removal and reinsertion of the connecting rod bolts. As shown primarily in FIGS. 2, 3 and 4 there is provided a support 24 comprising a planar member 25 having an internally threaded sleeve 26 welded at one end and serving as means to mount the support onto a ram 27 of a hydraulic press (not shown). The planar member 25 extends from the sleeve 26 in the direction of the longitudinal axis of the sleeve and in the direction of travel of the ram and has fixed thereto a pintle 28 extending normal from one face of the planar member and approximately in line with the axis of the sleeve 26. The pintle is spaced from the sleeve 26 to allow the mounting of a connecting rod 10 thereon by passage of this pintle through the wrist pin opening 15 of the connecting rod in the manner in FIG. 3. Thus with the support on the press ram, the connecting rod is positioned with the small end extending upward and the large end extending downward.

Figure 3:
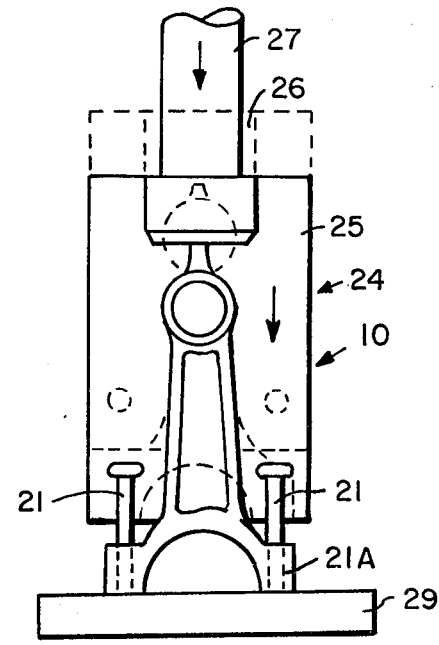
FIG. 3 shows the holder being moved downward into contact with the platen for removal of the bolts from the connecting rod mounted thereon.
Figure 4:
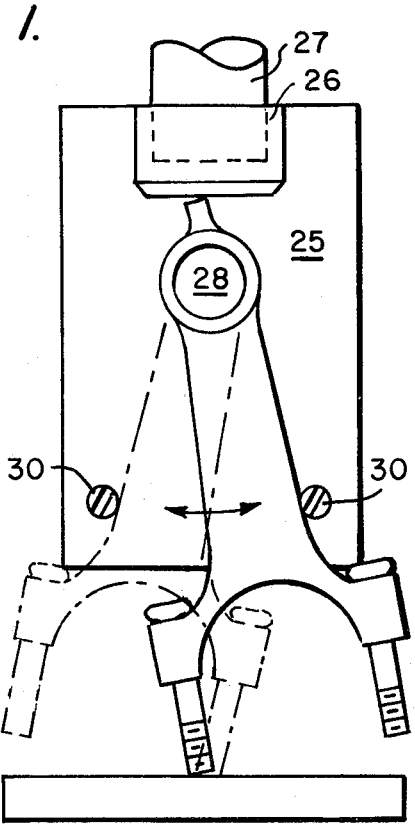
FIG. 4 is an enlarged view of a connecting rod mounted on the holder.

For removal of the bolts 21 from the holes 21A the ram 27 is actuated downward to bring the lower ends of the bolts into contact with the press platen 29. Continued movement of the ram downward will cause the bolts 21 to be forced out of the bolt holes as shown in FIG. 3. Movement downward of the ram can continue until the surface 19 of the connecting rod contacts the platen. Thereafter the bolts can be easily removed from the connecting rod holes because the bolt threaded ends are smaller in diameter than the bolt hole. Thus there is provided a simple yet effective tool for mounting a connecting rod on a ram head an by actuating the ram head downward permits removal of the bolts from the bolt holes.

In accordance with another feature of the invention there is provided means to prevent the connecting rod from sliding sidewise along the platen during the bolt removal operation as might happen if one bolt releases before the other. Release of only one bolt can result in the connecting rod pivoting clockwise or counterclockwise about the pintle 28 in the manner shown in FIG. 4. The direction of pivoting depends upon which bolt moves first. In other words if the left-hand bolt moves and the right-hand bolt remains tight, the connecting rod has a tendency to turn counterclockwise. If the left-hand bolt remains tight, the connecting rod tends to rotate clockwise.

To prevent pivoting of the connecting rod which can result in a quick rotation of the connecting rod about the pintle 28 if one bolt releases quickly, there is provided a pair of limit pins 30 preferably threaded into the plate 25 at positions spaced sideways from the connecting rod. If desirable, these pins can be fixed into slotted openings 30A which are slightly narrower than the diameter of the pins. Threaded into the pin end adjacent the member 25 is a bolt (not shown) which passes through the slot. The bolt terminates at a head which is larger than the slot 30 and is positioned on the other side of the planar member. by extending the slots in a direction more or less normal to the axis of the connecting rod positioned on this mount, adjustment can be made for rods of different widths to limit the travel or rotation thereof and keep the rod sufficiently straight such that continued downward movement of the mount will force the remaining bolt from the bolt hole.

Figures 5, 6:
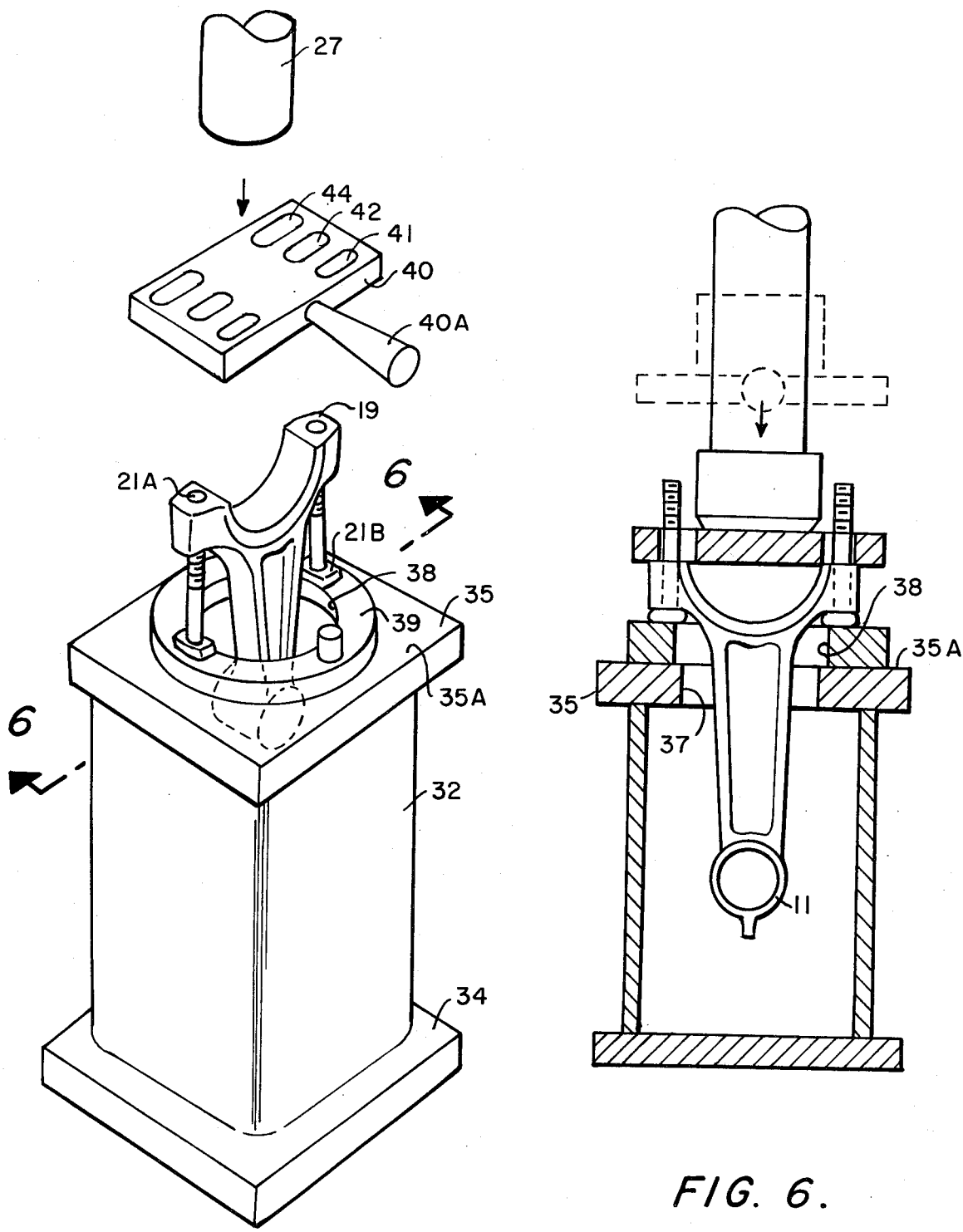
FIG. 5 shows the pedestal for the connecting rod and the bridge member used for reinserting the bolts into the connecting rod holes by lowering the press ram.
FIG. 6 shows the actuation of the press ram for forcing the bolts into the connecting rod holes.

In accordance with another feature of the invention, there is provided a support pedestal to achieve reinsertion of the bolts into the rod bolt holes with little or no damage to the machined surfaces of the connecting rod. For this purpose there is provided a pedestal 32 having a base 34 and a top 35. This pedestal is hollow as shown primarily in FIG. 6 with an opening 37 in the top thereof of sufficient size to receive the small end 11 of the connecting rod.

In the preferred embodiment there is provided an additional ring 39 which rests on the top surface 35A of the top 35 forming an opening 38 of sufficient size to receive the small end of a connecting rod. This ring presents a top surface for contacting the bolt heads 21B in the rod holes when the connecting rod is placed into the pedestal in the manner illustrated.

Thereafter a bridge 40 is placed across the upwardly facing surfaces 19 of the connecting rod. This bridge includes a plurality of pairs of spaced holes 41, 42, and 44 of varying sizes and spacings so as to accomodate different sizes and openings of connecting rod ends and connecting rod bolts. By placing this bridge in a position such that one pair of holes therein aligns with the holes 21A in the connecting rods the subsequent lowering of the ram 27 into contact with the bridge member forces the connecting rod downward while the bolt heads rest on the ring 39. In this manner the bolts are forced into the holes 21A of the connecting rod. The holes in the bridge member allow passage of the bolt ends past the bridge member as they are pressed through the connecting rod holes.

Thus it can be seen that there is provided a tool for insertion of these bolts into connecting rods by actuation of the press. Furthermore, this tool is made to accommodate several different sizes of connecting rods by use of bridge members with various sizes and spacings of openings and by interchanging the ring 39 to accommodate different spacings between the bolt heads.

The invention claimed is:

1. The method of inserting bolts into a connecting rod having a wrist pin end and a crankshaft end wherein the crankshaft end includes machined surfaces and bolt holes therethrough by use of a power press having a ram which can be actuated towards a platen, comprising the steps of:

placing a hollow pedestal on the platen having a center opening of sufficient size to receive the connecting rod end and having surfaces positioned in alignment with the bolt holes of the connecting rod;

placing the bolts partially into the bolt holes;

positioning the connecting rod in the pedestal with the wrist pin end therof extending downward into the pedestal center opening and the bolts in contact with the pedestal surfaces and the machined surfaces facing upwards towards the ram; and actuating the ram towards the platen to exert pressure on the machined surfaces to drive the connecting rod downward and force the bolts into the connecting rod bolt holes.

2. The method as defined in claim 1 including the step of placing a bridge member across the upwardly facing machined surfaces of the connecting rod and actuating the ram into contact with the bridge member.

3. A tool for use with a power press having a ram and a platen for driving the bolts into a connecting rod including a wrist pin end and a crankshaft end having bolt receiving holes therein, said tool comprising, in combination:

a pedestal member having an opening of sufficient size to receive the wrist pin end of a connecting rod;

said pedestal member having surfaces positioned in alignment with the bolt holes in the connecting rod;

a bridge member sized to fit across the crankshaft end of a connecting rod and including openings aligning with the bolt holes in the connecting rod; and whereby the pedestal member can be placed on the platen with the surfaces facing towards the ram and the connecting rod placed in the pedestal member with the wrist pin end extending in the opening thereof and the bolts in the connecting rod holes in contact with the pedestal surfaces and the bridge member placed over the crankshaft end of the connecting rod such that the ram in being actuated into contact with the bridge member will drive the connecting rod downward to force the bolts against the pedestal surface causing them to go into the connecting rod holes.

* * * * *